C. E. JOHNSON.
SHAKER.
APPLICATION FILED MAR. 2, 1920. RENEWED JULY 5, 1921.
1,389,510. Patented Aug. 30, 1921.
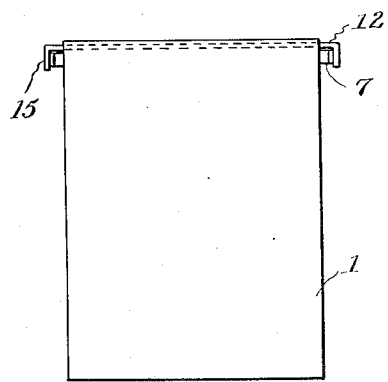
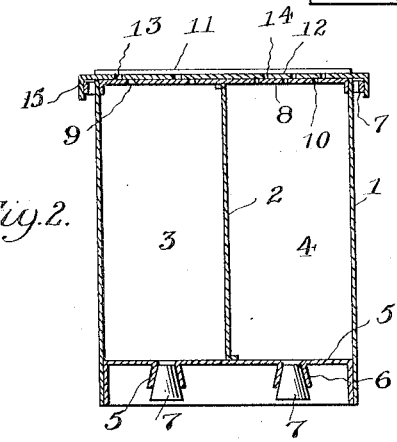
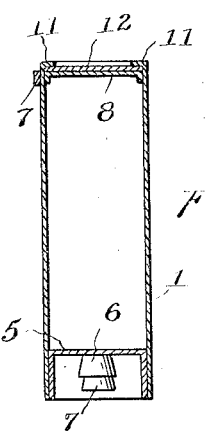
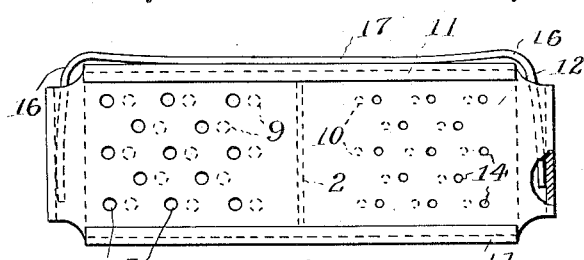
INVENTOR.
Clarence E. Johnson
BY Victor J. Evans
ATTORNEY.

UNITED STATES PATENT OFFICE.

CLARENCE E. JOHNSON, OF KANKAKEE, ILLINOIS.

SHAKER.

1,389,510.

Specification of Letters Patent.  Patented Aug. 30, 1921.

Application filed March 2, 1920, Serial No. 362,837.  Renewed July 5, 1921.  Serial No. 482,562.

*To all whom it may concern:*

Be it known that I, CLARENCE E. JOHNSON, a citizen of the United States, residing at Kankakee, in the county of Kankakee and State of Illinois, have invented new and useful Improvements in Shakers, of which the following is a specification.

This invention relates to a shaker for dispensing salt and pepper and has for its primary object the construction of a simple, inexpensive device in which the parts are so arranged and assembled that when the device is not in use salt as well as pepper will be prevented from escaping from the receptacle.

An object of the invention is the novel manner of constructing the slide and assembling it with the holes so that when in normal position all the holes will be covered but upon movement in either direction either "salt" holes or "pepper" holes will be uncovered.

A feature of my invention is the location of the spring so that normal tension of the spring will hold the slide in position to cover all of the holes but allowing the slide to be readily moved to either of two positions for dispensing either salt or pepper.

With these and other objects in view the invention will be better understood from the following detailed description taken in connection with the accompanying drawing wherein—

Figure 1 is a side elevation of the shaker.

Fig. 2 is a vertical sectional view.

Fig. 3 is a sectional view.

Fig. 4 is an enlarged top plan view of the shaker showing the holes in the slide in full line and showing the holes in the receptacle in dotted line.

Again referring to the drawing illustrating one manner in which my invention may be constructed the numeral 1 designates a receptacle which may be of any shape or construction having its interior divided by a partition 2 into a salt compartment 3 and a pepper compartment 4. The bottom 5$^B$ is countersunk so as to provide space for the flanged salt inlet 5 and the flanged pepper inlet 6, the stoppers 7 are for closing the inlets. The top 8 of the receptacle is provided with "salt" holes 9 and "pepper" holes 10. The top is provided with guides 11 for the reception of the slide 12. The slide is provided with salt holes 13 and pepper holes 14. The salt and pepper holes in the slide are so arranged with relation to the holes 9 and 10 that in normal position of the slide, as shown in Fig. 4, holes 13 and 14 will be out of registration with the holes 9 and 10 thereby positively preventing any loss of salt or pepper when the device is not in use, which is quite an advantage when the shaker is carried in the pocket or when traveling. At each end of the slide is provided a flange 15 forming a finger piece so that the slide may be forced in one direction to bring the pepper holes into registration and when forced in the opposite direction to bring the salt holes into registration. A leaf spring 16 is secured to the receptacle at the point 17 by solder or spot welded. The ends of this spring are bowed and yieldably engage the flanges 15 so as to normally hold the lid in position to arrange all of the holes in the lid out of registration with the holes in the slide.

It is, of course, to be understood that my invention may be constructed in various other manners and the parts associated in different relations and, therefore, I do not desire to be limited in any manner except as set forth in the claims hereunto appended.

Having thus described my invention what I claim is—

1. A shaker comprising a receptacle having a set of holes in its top communicating with a salt compartment, a second set of holes communicating with a pepper compartment, the bottom of the receptacle being raised and provided with flanged salt and pepper openings, stoppers for the openings and a slide slidably supported by the top of the receptacle for opening and closing the said holes and having depending flanges and a single leaf spring secured to the side of the receptacle and having its ends bent to yieldably engage said flanges.

2. A shaker comprising a receptacle having a set of holes in its top communicating with a salt compartment, a second set of holes communicating with a pepper compartment, a pair of guides formed on the receptacle, and a slide slidably supported by the guides for opening and closing the said holes and when in normal position covering all of the holes, said slide having its ends bent to form flanges, and a single leaf spring attached to the receptacle and having its ends bowed and engaging the flanges in such a manner as to normally hold the slide in a position to cover all of said holes.

In testimony whereof I affix my signature.

CLARENCE E. JOHNSON.